United States Patent [19]

Lillywhite et al.

[11] Patent Number: 5,127,540

[45] Date of Patent: * Jul. 7, 1992

[54] DOUBLE SHELL THICKENER

[75] Inventors: M. James Lillywhite, Salt Lake City, Utah; Michael E. Horn, Owensboro, Ky.

[73] Assignee: Baker Hughes Incorporated, Houston, Tex.

[*] Notice: The portion of the term of this patent subsequent to Nov. 20, 2007 has been disclaimed.

[21] Appl. No.: 549,859

[22] Filed: Jul. 9, 1990

Related U.S. Application Data

[63] Continuation of Ser. No. 367,826, Jun. 19, 1989, Pat. No. 4,971,214, and a continuation-in-part of Ser. No. 123,745, Nov. 23, 1987, Pat. No. 4,840,283.

[51] Int. Cl.⁵ .............................................. G01M 3/00
[52] U.S. Cl. ................................ 220/565; 220/445; 220/469
[58] Field of Search ................... 220/4.12, 445, 469, 220/565, 628

[56] References Cited

U.S. PATENT DOCUMENTS

| | | | |
|---|---|---|---|
| 1,670,024 | 5/1928 | Day | 220/565 |
| 3,511,003 | 5/1970 | Alleaume | 220/445 X |
| 3,537,608 | 11/1970 | Fallows et al. | 220/565 X |
| 3,748,865 | 7/1973 | Laverman et al. | 62/50 |
| 3,930,590 | 1/1976 | Ebbrell | 220/565 X |
| 3,952,531 | 4/1976 | Turner | 62/45 |
| 4,374,478 | 2/1983 | Second | 220/426 |
| 4,522,010 | 6/1985 | Schrader | 220/565 X |
| 4,584,802 | 4/1986 | Casselman et al. | 52/169.7 |
| 4,651,895 | 3/1987 | Ebert | 220/469 |
| 4,653,312 | 3/1987 | Sharp | 220/469 X |
| 4,673,102 | 6/1987 | Bullock, Jr. | 220/457 |
| 4,714,170 | 12/1987 | Scott | 220/565 X |
| 4,715,513 | 12/1987 | Shelton, Jr. | 220/469 |
| 4,840,283 | 6/1989 | Lillywhite et al. | 220/5 A |
| 4,971,214 | 11/1990 | Lillywhite et al. | 220/5 A |

Primary Examiner—Steven M. Pollard
Attorney, Agent, or Firm—Skjerven, Morrill, MacPherson, Franklin & Friel

[57] ABSTRACT

A double-walled thickener tank has an outer shell bottom and an inner shell bottom spaced to form interconnected or a discrete void space therebetween. An incompressible load-carrying permeable material such as oil-impregnated sand is compacted in the void space(s) to provide a support for the inner shell bottom and confined fluid in the tank. Any leakage of fluid from the tank through the inner shell bottom is initially confined in the void spaces and conveyed down a slight slope on the top surface of the outer shell bottom so the leakage fluid drains into an interior space of a double-wall or single-wall discharge cone at the center of the tank where the leak and void spaces are accessed to detect any leaking of fluid from the tank. Various modifications utilize either a replacement of a new inner tank liner, a bottom sheet of impervious material such as a plastic liner; a series of pie-shaped steel sheets forming each bottom; or a grooved concrete bottom, all providing a flat or inclined void space, with or without load-carrying permeable material therein, which is accessed for leak detection.

22 Claims, 4 Drawing Sheets

CONTAINERS FOR LIQUIDS

This invention relates to containers for liquids, and is particularly, although not exclusively, concerned with containers for use with apparatus for delivering herbicides over the ground.

There exist hand-held lances for delivering herbicide which comprise a handset and a delivery head which is connected to the handset by a tubular support. The handset is held by the operator, and the tubular support enables him to position the delivery head just above the ground to be treated.

European patent specification No. 0300762 discloses such a lance in which a container of herbicide is secured directly to the handset. The container comprises a rigid outer wall within which is disposed a flexible partition, dividing the interior of the container into two compartments. One of these compartments contains the herbicide, and the other communicates with the atmosphere through a vent hole in the part of the rigid wall bounding that compartment. An outlet is provided in the part of the rigid wall bounding the herbicide filled compartment. When fitted to the handset, the container is partially accommodated in a cavity in the handset, and the outlet is connected to an inlet fitting to enable herbicide to flow from the container to the delivery means.

A problem with such a container is that penetration of herbicide through the flexible partition, in the event of a defect in the partition, may result in the herbicide flowing to the outside through the vent hole. This can occur during storage or transport of the fluid container. Because herbicides, and other materials which may be packaged in similar containers, can be dangerous to humans or can otherwise constitute an environmental hazard, such leakage, even if relatively small, is undesirable.

According to the present invention, there is provided a container for receiving a liquid, the container being adapted for fitting to a delivery device for delivering the liquid, and having a liquid outlet, for dispensing the liquid to the delivery device, and a vent hole for admitting air to the container to replace dispensed liquid, the vent hole being closed by a closure element which is removable to expose the vent hole, characterized in that the closure element is positioned for engagement with the delivery device, as the container is fitted to the delivery device, thereby to be removed from the container to expose the vent hole.

The closure element may, for example, be an adhesive tape covering the vent hole, which tape is removed automatically as the container is fitted to the delivery means. In a preferred embodiment, however, the closure element is a projection, which may be moulded integrally with the wall of the container, which projection is broken off as the container is fitted to the delivery means.

According to another aspect of the present invention, there is provided a container for receiving a liquid, the container having a liquid outlet for dispensing the liquid and a vent hole for admitting air to the container to replace dispensed liquid, the vent hole being enclosed, on the exterior of the container, by a closure element which projects from the wall of the container and is breakable from the wall of the container to expose the vent hole.

For a better understanding of the present invention, and to show how it may be carried into effect, reference will now be made, by way of example, to the accompanying drawings, in which:

FIG. 1 shows a lance for delivering herbicide, fitted with a container of herbicide;

FIG. 2 is an enlarged view of a handset of the lance of FIG. 1, showing the container partially fitted;

FIG. 2A is an enlarged fragmentary view of the junction between the handset and the container;

FIG. 3 is an enlarged sectional view of part of the wall of the container;

FIG. 4 is a diagrammatic exploded view of the container;

FIG. 4A is an enlarged view of part of the container shown in FIG. 4;

FIG. 5 is a sectional view of the filled container;

The lance shown in FIG. 1 comprises a handset 2 from which extends a rigid support member in the form of a tube 4. The tube 4 carries a delivery device in the form of a spraying head 6 which accommodates an electric motor (not shown) for driving a distribution element 8 in the form of a spinning disc.

A duct (not shown) extends from the handset 2 through the tube 4 to the spraying head 6. The handset 2 is provided with a valve (not shown) which can be operated by means of a trigger 12. A battery providing the source of power for the motor in the head 6 is accommodated in the handset 2, for example in a compartment 14 at the forward end of the handset.

The handset 2 comprises a somewhat U-shaped body made up of a first limb 102, which receives the tube 4, a second limb 104, which constitutes a handle member, and a connecting portion 106. The duct 10 enters the limb 102 and is connected to the outlet of the valve.

The connection portion 106 has a cavity which is occupied by the forward portion of a container 134 of herbicide. The rearward part of the container 134 projects from the cavity. The container comprises two casing halves 136 and 138 which adjoin one another at a seam 140. The two casing halves 136, 138 are substantially mirror images of one another, and so the container as a whole is generally symmetrical about the seam 140.

A flexible partition 40 (FIG. 5) extends between the casing halves 136 and 138, being secured to these casing halves at the seam 140. The interior of the container is thus divided into two compartments, one of which is defined between the flexible partition and the casing half 136, and the other of which is defined between the flexible partition and the casing half 138.

The casing half 136 is provided with an outlet fitting 150 which, when the container is fitted to the handset, engages an inlet fitting provided within the cavity so as to enable herbicide to flow from the container to the valve and hence to the head 8.

The casing half 138 is provided with a vent hole 53 (FIG. 3). The vent hole 53 is positioned on the casing half 138 so that, when the container is fitted to the handset 2, it is within the cavity. Before the container is first used, the vent hole 53 is enclosed, at the outside of the container, within a rigid tubular projection 56 formed on the casing half 138. The projection 56 has a closed end 58, so that the compartment defined between the flexible partition and the casing half 138 is wholly sealed from the surroundings.

The handset is provided with latching means in the form of a lever 162. This lever is freely pivoted, to the portion 102 of the handset. When the container 134 is inserted into the cavity, the lever engages within reces-

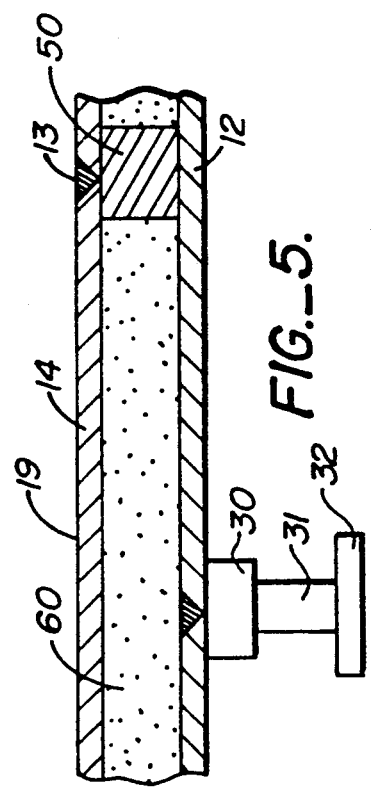
FIG._3.
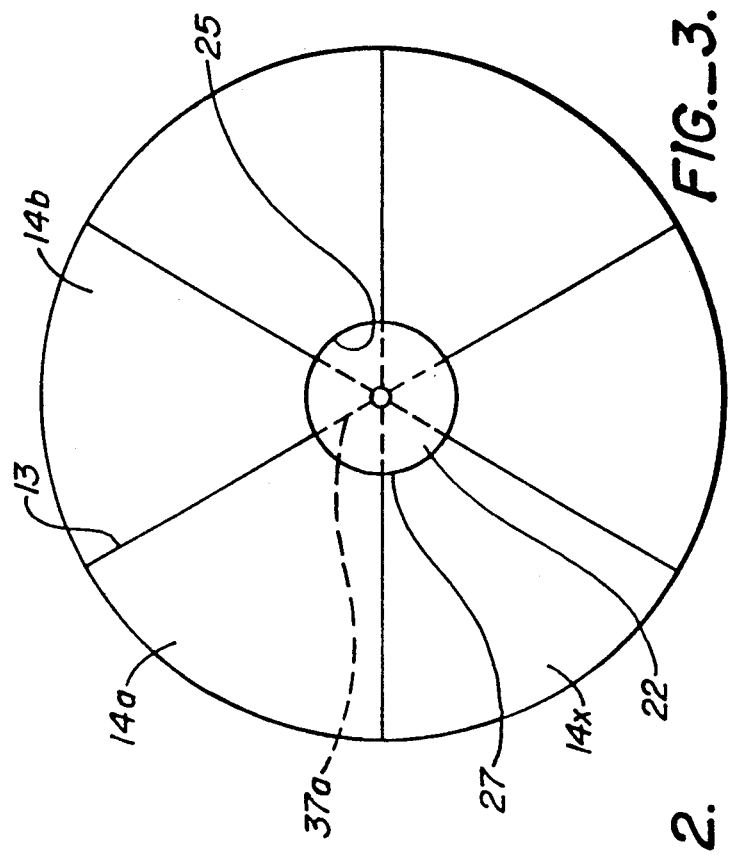
FIG._5.
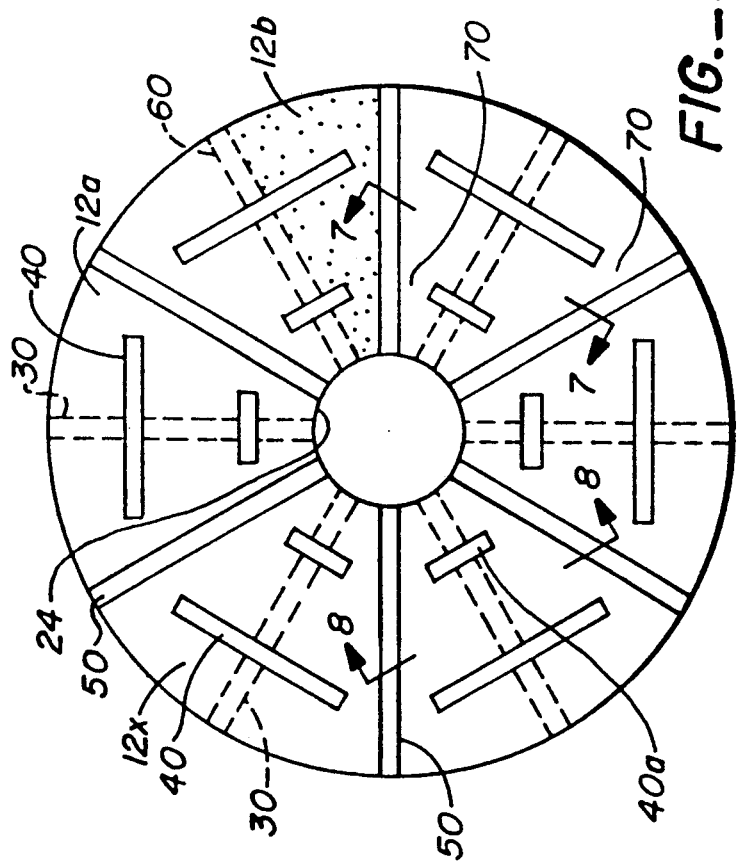
FIG._2.
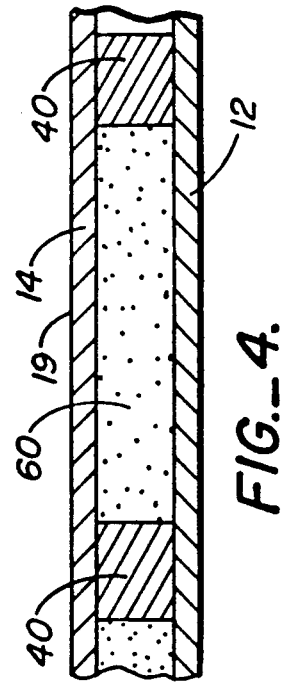
FIG._4.

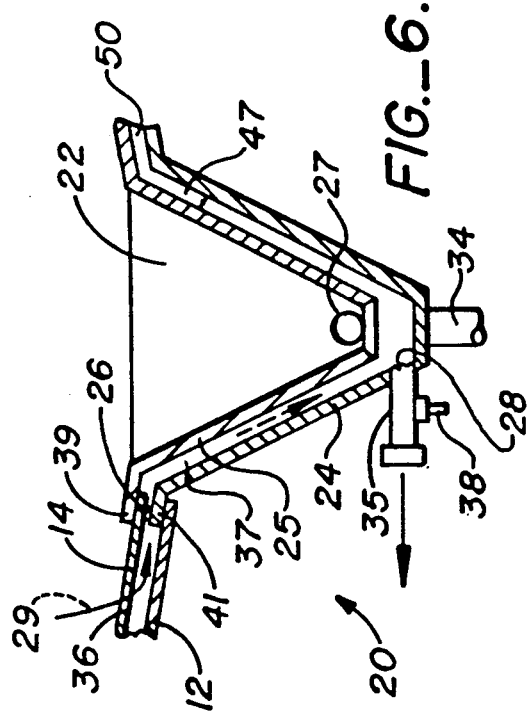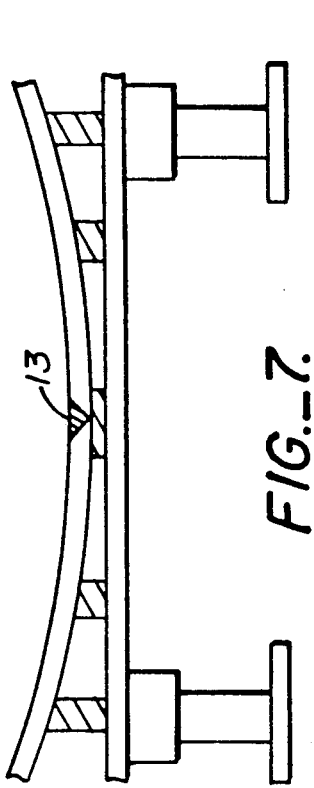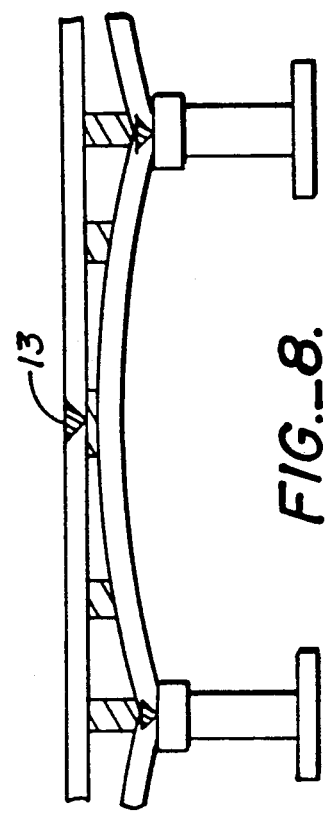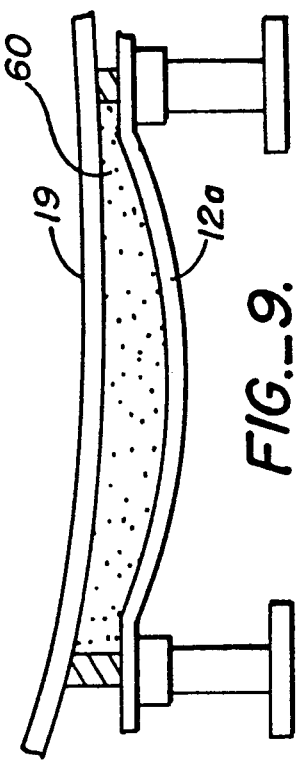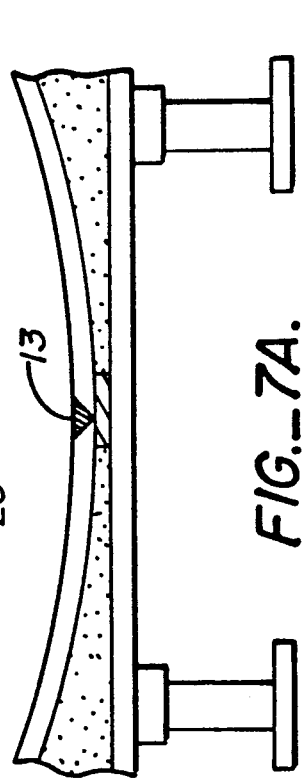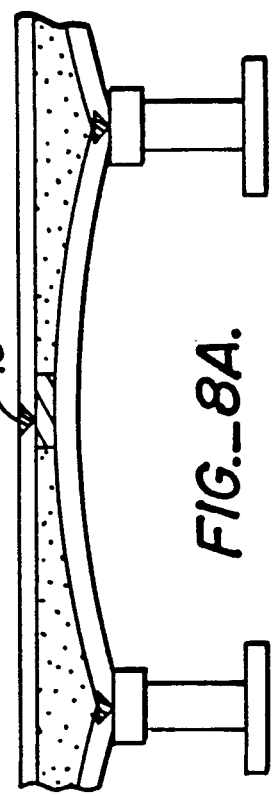

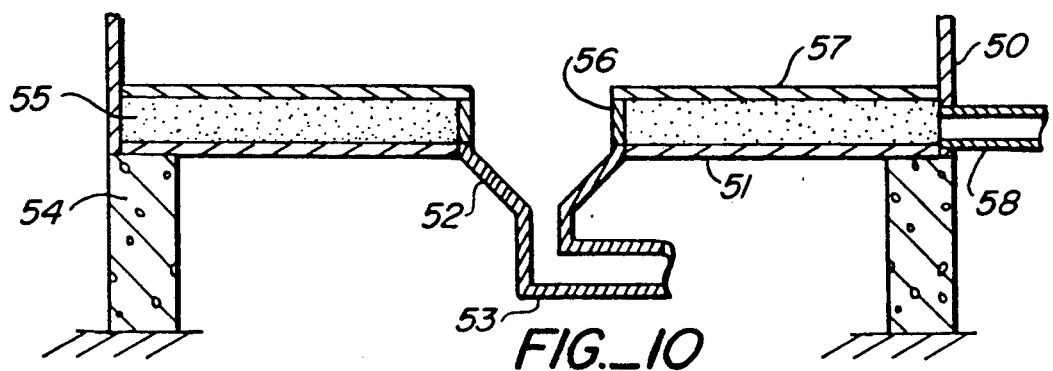
FIG._10
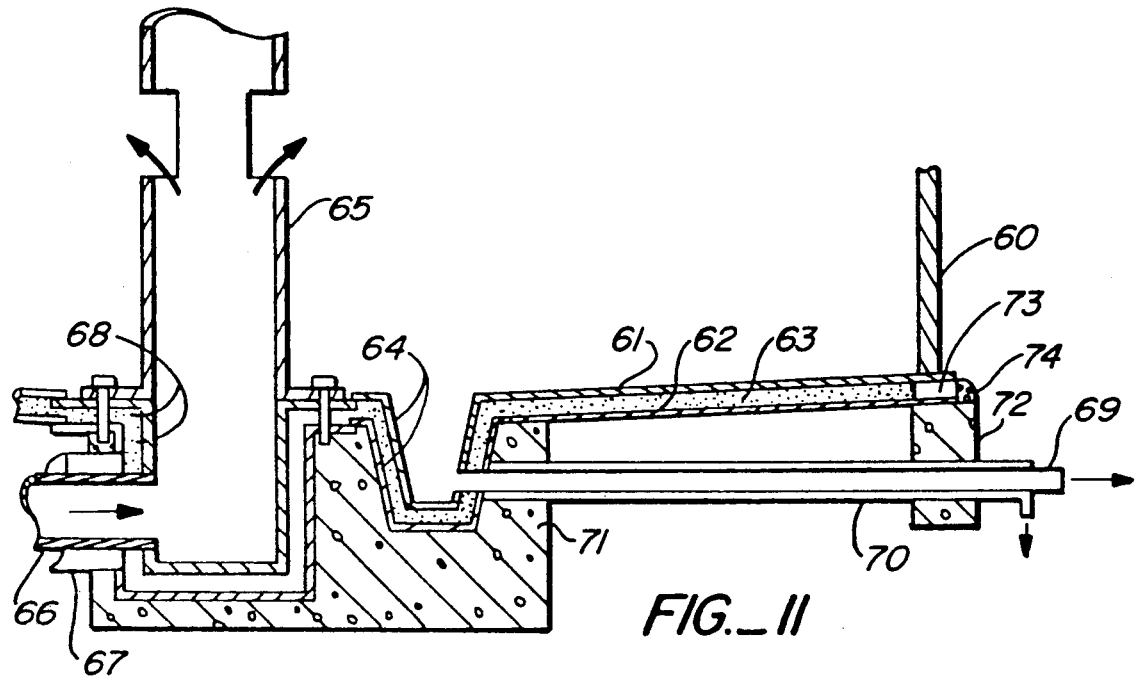
FIG._11
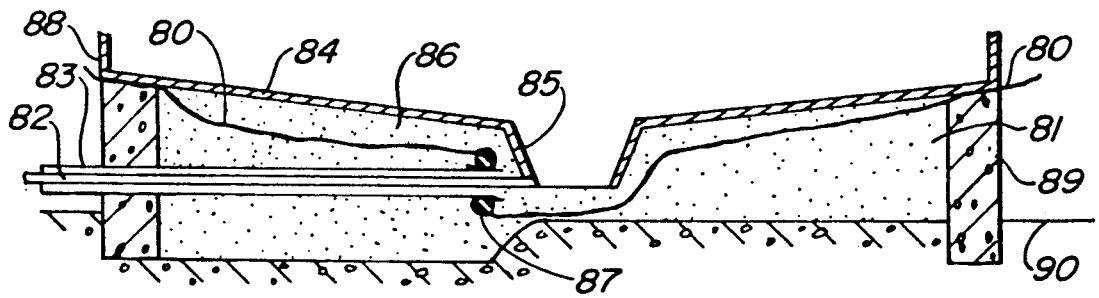
FIG._12
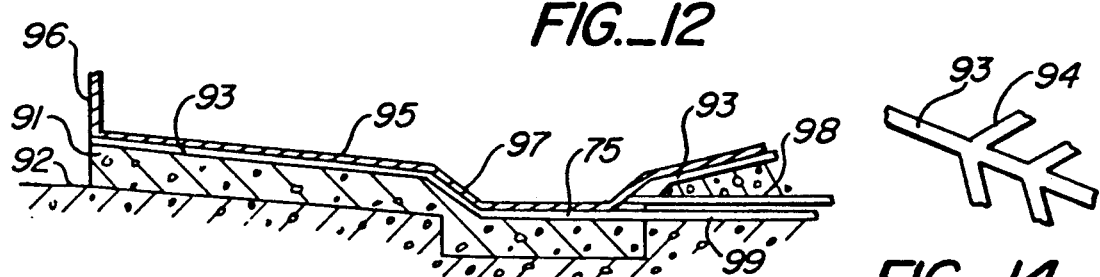
FIG._13
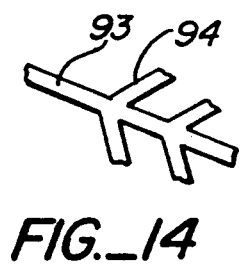
FIG._14

DOUBLE SHELL THICKENER

This application is a continuation application of Ser. No. 07/367,826, filed Jun. 19, 1989, now U.S. Pat. No. 4,971,214, issued Nov. 20, 1990; and a continuation-in-part of U.S. application Ser. No. 07/123,745, filed Nov. 23, 1987, now U.S. Pat. No. 4,840,283, issued Jun. 20, 1989.

This invention relates to double-wall fluid containment tanks. More particularly, the invention is directed to a double-wall elevated or ground-supported thickener, clarifier or other equipment used in liquid-solid separation processes, including waste water treatment.

BACKGROUND OF THE INVENTION

Heretofore, most fluid containment tanks have been comprised of a single-wall construction including a single-wall side wall and a shell bottom for containing the fluid and for supporting the weight of the fluid in the tank. The shell bottom normally rests on wooden, steel beam or concrete supports resting on pylons or a ground support. When a toxic or other ground water damaging or medically hazardous material is to be confined, double wall containments have been mandated. Thus in the case of certain waste water treatment processes the U.S. Environmental Protection Agency (EPA) have required a double-wall containment. Water treatment equipment as mandated by the EPA typically comprise double-wall barriers made up of two totally separate tanks. As an example, a concrete floor with peripheral vertical concrete walls will be lined with a metal liner or painted. Inside this large normally open-to-the-atmosphere containment, a steel elevated tank will be erected and utilized. Any leakage from the elevated tank will be captured and monitored by means of the concrete containment.

Other equipment has utilized double containment barriers. Scrubbers used in the Power industry utilize a liner (a corrosion-resistant thin material) laid directly against a heavier structural load carrying shell (noncorrosion resistant). Leakage is monitored in the annular area. Oil tankers also utilize double-barrier containments.

SUMMARY OF THE INVENTION

A double-wall tank construction is provided in which an inner shell bottom is supported over essentially all of its area and wherein any leakage from the interior of an overall inner fluid-holding containment is detectable by centrally accessing the space between the inner containment and an outer containment. A suitable load-carrying permeable material is preferably placed in void spaces formed by spacer bars erected between an outer shell bottom and the inner shell bottom or by permeable material, per se, placed between a ground-supported outer bottom liner and an inner shell, which not only provides overall support for the inner shell and its fluid contents, but provides a material which allows for the flow of any fluid leaking from the inner shell into the space between the shells (or shell and liner) to be detected at multiple access detection locations or at a single detection location.

In a preferred embodiment the outer shell is first formed on suitable radial support beams which normally are leg-supported. The edges of pie-shaped steel sheets are mounted on and secured, as by welding, to the support beams to provide structural and seal integrity of the outer shell. Radial and segmented annular support bars are welded to the top of the outer shell and sand or other inert granular material is filled and compacted between the radial and annular support bars which space the outer and inner shell bottom from each other. The edges of other pie-shaped steel sheets which form the inner shell are then secured, as by welding, to the radial support bars to provide structural and seal integrity for the inner shell. In the case of a liquid-solid thickener such as those finding extensive application in waste water treatment the inner shell bottom is formed in a first inverse cone configuration to accommodate a rotating solids-moving rake structure which transports settled solids to a central sludge discharge cone attached to and extending through a central aperture in each of the inner shell bottom and outer shell bottom.

Means are provided for accessing one or more locations in the void spaces between the inner and outer shells for detection of any leaks through the inner shell into the void spaces. In the preferred embodiment access is provided by providing a double-wall sludge discharge cone which allows for drainage of leaked fluid from the interstices of the permeable material in the void spaces between the inner shall bottom and outer shell bottom to a suitable drainage nozzle extending from an outer wall of the discharge cone. A sludge discharge nozzle extends in the cone through both walls of the discharge cone to facilitate pumped removal of settled sludge from the discharge cone interior.

Among the unique features of this invention are: the inner shell is separated and supported from the outer shell by means of a combination of moldable incompressible material (such as oil impregnated sand) with or without bearing bars therein; inner tank fluid leakage is collected in one central area; leakage can freely flow to the central area since continuous annular supports are not required; the tank bottom outer shell is normally erected with a combination of flat plates, for example, as pie-shaped or coned segments or as in the form of a fluid impervious material such as a plastic liner or grooved a concrete bottom. The constructions allow the inner shell to be formed into a cone to enhance the total swept area of a rotating rake arm; and corrosion is minimized by utilizing a minimal number of flow restrictions, i.e. bearing bars, or having the entire inner bottom shell supported on the oil-impregnated sand and on concrete peripheral foundation.

As can be seen, the tankage of the invention may be erected all above ground or in a formed depression in the ground. An exotic inner tank liner (stainless steel or other material) may be employed with a less expensive outer shell thus reducing overall cost. Dual containment may also be applied solely to the tank bottoms. The term "thickener" as used herein means any thickener or clarifier or other double-containment vessel used in the water, wastewater or chemical or metallurgical process industries which is utilized in liquid-solids separation processes.

BRIEF DESCRIPTION OF THE DRAWINGS

FIG. 1 is a schematic half, partial cross-section side view of a thickener incorporating the invention.

FIG. 2 is a plan view of an outer shell bottom of a thickener tank at an interim step of tank erection.

FIG. 3 is a plan view of the tank inner shell bottom in tank assembled condition.

FIG. 4 is a cross-section view of a radial section of the tank bottom taken on the lines 4—4 of FIG. 1.

FIG. 5 is a cross-section view of an arcuate section of the tank bottom taken on the lines 5—5 of FIG. 1.

FIG. 6 is a cross-section side partial view of the discharge cone showing its connection with the tank outer and inner shell bottoms.

FIG. 7 is a cross-section view of a chord section taken on the lines 7—7 of FIG. 2 showing a series of space bars between the shells.

FIG. 7A is a cross-section view of a chord section similar to FIG. 7 with sand filling the void spaces between the outer and inner shell.

FIG. 8 is a cross-section view of an arcuate section taken on the lines 8—8 of FIG. 2 showing a series of spacer bars between the shells.

FIG. 8A is a cross-section view of an arcuate section similar to FIG. 8 with sand filling the void spaces between the outer and inner shells.

FIG. 9 is a schematic cross-section side view along a radial showing a modified scalloped form of outer liner.

FIG. 10 is a schematic cross-section side view of an embodiment wherein a replacement of a new inner tank liner is employed to effect a conversion of a single bottom tank to dual containment tankage.

FIG. 11 is a schematic cross-section side view of a center column-type thickener employing the invention.

FIG. 12 is a schematic cross-section side view of an embodiment of the invention employing a sheet of fluid impenetrable material as the outer tank bottom.

FIG. 13 is a schematic cross-section side view of a further embodiment of the invention utilizing a grooved concrete outer liner bottom.

FIG. 14 is a schematic plan view of the grooved surface of the outer bottom of the FIG. 13 liner.

DETAILED DESCRIPTION OF THE PREFERRED EMBODIMENT

As shown in FIG. 1 a double-wall bottomed thickener 10 comprises a circular vertical tank wall 11 surrounding and attached by welding or the like to the peripheral edges of an outer shell bottom 12 and an inner shell bottom 14 spaced therefrom by arcuate, i.e. preferably straight, sections extending laterally across an arc segment, spacers 40 and radial spacers 50. Each of the shown outer long arcuate spacers 40 and inner short arcuate spacers 40a extend for a distance less than the distance between adjacent radial spacers 50 forming gaps 70 there between allowing flow of leaking fluid therepast. The inner shell bottom has an inverse conical top surface 19 which receives settled solids or sludge from a solids-containing fluid contained in the tank formed by wall 11 and inner shell bottom 14. Wall 11 may be a double-wall, the interior 6 of which between wall 11 and wall 9 is in flow communication with the space between outer shell bottom 12 and inner shell bottom 14.

As well know in the thickener art, typically a walkway truss 7 bridges across the tank and supports a rake drive mechanism 16. A central turbine shaft 15 extends into the tank from the drive mechanism and rotates one or more rake arms 17 affixed to the shaft end. Rake blades 18 extend downwardly along the rake arm. Blades 18 may include stainless steel or rubber squeegees on their bottom edges. Blade 18 rotates around the tank bottom surface 19 to transport settled solids radially inwardly into a central discharge cone 20. Solid line arrows 21 illustrate the movement of sludge from surface 19 to the interior 22 of the discharge cone. A sludge outlet 23 extends from the cone interior and is connected to a sludge pump (not shown) for removal of settled sludge from the thickener and the discharge cone. Not shown in FIG. 1 are conventionally employed peripheral tank launders, weirs, sampling ports, reaction wells, baffling and influent piping, for example.

In order to support the weight of the fluid in the thickener 10 in the preferred embodiments, an inert, non-compressable, load-carrying material 60 fills the void spaces 36 between the shell bottoms 12, 14 and between the spaced arcuate and radial spacers extending in the space between the shell bottoms. In the preferred embodiment the void spaces are filled and compacted with oil-impregnated sand. Clean 30-mesh siliceous sand saturated with a heavy-base petroleum oil (motor oil) may be used.

Any leakage of fluid in the thickener tank either through the inner wall or the inner shell bottom 14 will drain into the permeable sand 60 and be conveyed by the inward slope, typically being at a slope rate of about 1:12 to about 2.5:12, along the outer shell bottom through the sand in void spaces 36 and past the arcuate and radial spacers 40, 50 into a downwardly sloping space 37 between the double walls of the discharge cone, and then to a leak detection fluid outlet nozzle 35 which accesses the void spaces between the double side walls, the double-shell bottoms and the double discharge cone walls.

While the tank has been described in terms of a thickener tank, the tank may be used for clarification, floatation or as a simple storage tank for liquids or liquid—solids slurries.

Fabrication of the aforesaid structure is performed by providing suitable concrete pedestals 32, 33 on a concrete or other suitable ground support surface 46. Outer support legs 31, spaced around the tank periphery, support one end of a series of radial support beams 30 which are secured, as by welding, at their opposite ends onto the outer shell 24 of discharge cone 20. Discharge cone 20 may be supported by a center support leg 34 extending above pedestal 33.

As shown in FIG. 2 a series of pie-shaped steel sheets 12a, 12b, . . . , 12x, then are placed on and connected, as by radial edge welding, to the radial support beams 30 forming the outer shell bottom 12. The inner peripheral edges of the sheets are fitted to and connected, as by welding, to an angular flange extension 41 of the cone shell 24. Radial spacer bars 50 and segments of arcuate spacer bars 40 are spacedly positioned on the top of the outer shell bottom and sand 60 impregnated with oil for corrosion resistance is placed and compacted in the void spaces between and even with the top level of the upstanding spacers 40, 50. In the preferred embodiment the sand is smoothed into an inverse cone-like top surface corresponding to the desired slope of the top surface 19 of inner shell bottom 14. Sand is only used on the flatter surfaces of the tank bottom, not the central cone area. As seen in FIG. 7A the sand is brought up to a level adjacent to the tops of the bars and the bars remain exposed for welding. FIG. 7 shows bars of various heights between which sand is placed and contoured as seen in FIG. 7A.

Pie-shaped steel sheets 14a, 14b, . . . , 14x are then positioned with their edges abutting and in engagement with the tops of the radial spacer bars 50. The inner peripheral edges of the sheets 14a to 14x are inserted under an angular annular flange 39 of inner cone shell 25 (FIG. 6). The steel sheets are then secured in place by a seam weld 13 (FIG. 3) preferably connecting the adjacent abutting steel sheets to their underlying radial spacer bar 50. The inner shell bottom is spaced above the outer shell bottom a distance of ¼"-1" depending upon the diametric size of the tank and where along the radial surface of the tank bottom surface 19 the measurement is taken. In a typical 25 foot ID tank having a 10 foot vertical wall, ¼" thick steel sheets are utilized for the inner and outer shell bottoms.

The walls of the tank are also of double-wall construction having gapped vertical spacer bars 6 therebetween for providing the void between the liner and outer shell. However, in contrast to the bottom this void typically is not filled with sand or other material. In the event that additional wall strength is required, it is however contemplated that an incompressible yet permeable material such as sand or a perforated honeycomb structural insert could be provided in this void in the wall.

One or more spaced vacuum release fittings 8 extend from the tank exterior into the space between walls 9 and 11 to provide for relief of any vacuum in the void spaces and provide air column pressure to assist in leak drainage to the discharge cone.

The use of double-wall construction with sand (or other suitable load-carrying, permeable material) therebetween enables the upper surface 19 of the bottom of the tank to assume the desired shape. As best shown in FIG. 5 and because the radial support beams for the elevated tank and the pie-shaped sheet steel outer shell segments are of generally planar construction, their assembly to form the bottom of the tank cannot conform to a conical surface. The use of a flowable, yet load-carrying material such as sand between the inner liner and outer shell allows the necessary dimensional accommodation between the desired upper conical surface and lower planar approximation thereto. This explains the range of distances between corresponding points on the upper liner and lower outer shell. Of course, a conical surface as opposed to a planar approximation thereof enables the rake arms to sweep the bottom 19 of the tank clean rather than leaving pockets of unremoved material which can then ferment. This is important for tanks used to handle organic matter which could become septic if left unremoved.

The double-wall construction allows any leakage through the liner to be collected and detected at an exit from the space between the inner shell bottom and the outer shell bottom to prevent contamination of the environment with hazardous chemicals or other materials as may be required by the EPA.

FIG. 4 shows a detail of the spacing between outer shell bottom 12 and inner shell bottom 14 by arcuate spacer bars 40. Oil-impregnated sand 19 is shown compacted in the void space between bars 40. FIG. 5 shows a detail of the above spacing adjacent a radial spacer bar 50 with oil-impregnated sand 60 in the adjacent void spaces.

FIG. 6 illustrates in detail the connection of the inner annular peripheries of the shell bottoms with the double-walled discharge cone 20. The discharge cone has circular flanges 39, 41 which receives the shell bottoms. A series of ¼"×2"×2" spaced spacer bars 26 allow drainage of leaked fluid from the space 36 between the shell bottoms 12, 14 into the space 37 between cone walls 24, 25. As shown by the dotted arrows 29 any leaks from the tank 10 through inner shell bottom 14 (or through vertical inner wall 9 into space 36—FIG. 1) is drained through the granulated material and conveyed by the slope of the inner surface of cone wall 24 to the bottom of the cone where the leakage and spaces 36, 37 are accessed by nozzle 35. A suitable fixed screen 28 retains any sand which is purposely or inadvertently found in the cone interior wall space 37. A suitable standard liquid detector and monitor with suitable alarm, attached to nozzle 35 or an enclosed Plexiglas sight glass may be provided to visually observe any leakage.

The double-wall construction allows a supply of air or nitrogen or other suitable gas to be provided to the void space 36 through inlet 38 or through one of the valve fittings 8 for detecting the existence of leaks in the inner liner by visually observing gas bubbles appearing at the top of the liquid in the tank or by a drop in supply gas pressure indicative of a leak in the fluid containment.

The use of spacer bars of a predetermined length, configuration, and placement in the void spaces can enable the tank to be divided into a number of independent void spaces for detecting leaks in predetermined portions of the tank. In this regard, the spacer bars may be used to divide the bottom of the tank into relatively small pie-shaped sections and the wall divided into a plurality of arcuate nonconnected sections if so desired. As seen by dash lines 37a in FIG. 3, similar discrete sections can be provided (FIG. 6) in the discharge cone by providing longitudinal spacers 47 in the cone space 37 connected to each radial bar 50 and separate leak detector nozzles attached to each discrete pie-shaped segment section, formed between each of the longitudinal cone spacers, at the cone discharge bottom. Referring to the drawing and the tank liner detail thereof, it is apparent that the wall voids can be separated and made independent of the void spacers in the bottom of the tank. Alternatively the wall void spaces can be placed in communication with a suitable nozzle(s) accessing the void space(s).

As seen in FIG. 9, if a scalloped bottom is used (as is done frequently on elevated tanks greater than 60 foot diameter) the inner sloped liner 19 may be spaced from ¼" to several feet (adjacent the low point of the scalloped section 12a) from the bottom tank shell.

FIG. 10 illustrates the use of the invention to effect a conversion of a single tank bottom to dual bottom containment tankage. The original tank contains a cylindrical sidewall 50, a tank bottom 51, a sludge discharge cone 52 and a sludge exit pipe 53, all typically mounted on individual concrete or other piers 54 or a continuous ring support structure.

After repair of any leak in bottom 51, a vertical or sloped collar 56 is affixed by welding, or the like, to cone 52. A layer of compacted load-carrying permeable material 55, such as oil-impregnated sand, is then placed over bottom 51 and around the collar 56. A new replacement inner bottom 57 normally made of steel sheets is positioned to rest on and be supported by the compacted sand and welded to the top of collar 56 and to the tank sidewall. This forms a new fluid-tight tank bottom 57. Lastly, a leak detection pipe 58 is provided extending through the original tank sidewall 50 accessing the compacted sand void volume between the tank bottoms 57 and 51 so as to detect any leaks through the new inner bottom 57. While shown as a flat surface, the bottom 57 may be inclined as is the inner bottom in FIG. 1 and may include a rake structure, also as shown in FIG. 1.

FIG. 11 shows a center column-type thickener/clarifier including a steel cylindrical vertical tank wall 60, a steel inner liner bottom 61, a steel outer liner bottom 62, compacted oil-impregnated sand 63 or other permeable material in the void space between the bottoms, a double-wall cone sludge pit 64 offset from an influent column 65 which is fed influent by a bottom inlet pipe 66. A leak detection pipe 67 concentrically surrounds pipe 66 and the annulus therebetween accesses the void space 68 between the bottoms 61 and 62. A sludge exit pipe 69 connects the interior of cone sludge pit 64 to discharge while another concentric pipe 70 accesses the void space between the walls of the cone sludge pit and also the void space between the bottoms. Suitable detection means (not shown) detects leaks directed outwardly in the annuli between pipes 66, 67 and pipes 69, 70. A concrete center pier 71 and peripheral pier(s) or ring wall 72 support the tank, influent column and sludge pit. The tank wall is shimmed to the ring wall at 73 and grout 74 applied to seal the peripheral edge between the bottoms.

The FIG. 12 embodiment provides double-containment by utilizing a sheet of fluid impervious material such as a polyethylene or other plastic liner 80 typically of about 40 thickness which is placed over and is supported by a bed 81 of compacted oil-impregnated sand or other permeable material properly contoured to approximate the desired final slope of the inner bottom of the tank. A radial ditch is provided to receive a sludge exit pipe 82. A concentric leak detection pipe 83 accesses a compacted sand-containing void volume above the plastic liner 80 which is formed in the space above the liner and an inner steel tank bottom 84 containing a single wall sludge discharge cone 85. Compacted sand 86 supports bottom 84 and allows any leaks through bottom 84 to be directed to the annulus between pipes 82, 83 for detection. A portion of liner 82 is suitably clamped and sealed by a ring clamp 87 or the like to the exterior of pipe 83 and the outer periphery of the liner sealed under the outer periphery of bottom 84 and cylindrical wall 88 on the top of a ring wall 89 supported by the ground 90.

FIG. 13 shows a further embodiment in which a circular concrete base 91 is poured at ground level 92. A series of radial spaced grooves 93 are provided on the top surface of the base 91 which intersect with side grooves 94 (FIG. 14). An inner steel shell bottom 95 is positioned over and is supported by the concrete base 91 either directly or on a bed of compacted sand therebetween. A cylindrical tank wall 96 and a single wall sludge cone 97 completes the inner tank. A sludge exit pipe 98 extends outwardly from the inner surface of the sludge cone. A leak detection pipe 99 extends from a sump 75 under the sludge cone comprising a grooved central surface of the base 91 which is in flow communication with grooves 93, 94 so as to convey any fluids from the tank which may have leaked through bottom 95 to a position exterior of the tank for detection.

The above description of embodiments of this invention is intended to be illustrative and not limiting. Other embodiments of this invention will be obvious to those skilled in the art in view of the above disclosure.

We claim:

1. A dual-containment tank system for a solids/liquid slurry loaded thickener/clarifier wherein solids settle within said tank system comprising:
   means for ground supporting a cylindrical tank shell having an upstanding side wall;
   an inner tank shell bottom sealingly extending across a bottom of said side wall for holding a quantity of solids/liquid slurry in the tank shell;
   a sludge drain extending through said shell bottom for removal of solids that settle on the tank shell bottom;
   an outer tank shell bottom extending beneath, generally co-extensive with and spaced from said inner tank shell bottom to form a void space between said shell bottoms;
   the shape of the upper surface of the outer tank shell bottom corresponding generally to the shape of the lower surface of the inner tank shell bottom, with the inner tank shell bottom being generally nested in the outer tank shell bottom;
   means for accessing said void space for enabling detection of leakage of liquid in the tank shell through the inner tank shell bottom into the void space; and
   in which said sludge drain comprises a spaced double-wall cone and a discharge tube extending from an inner surface of said cone to sludge discharge exterior of said tank and in which said means accessing said void space includes a leak detection tube extending to a position exterior of said tank shell.

2. The tank system of claim 1 wherein said discharge tube extends within said leak detection tube.

3. The tank system of claim 1 further comprising a bed of compacted permeable material in said void space.

4. A dual-containment tank system for a solids/liquid loaded thickener/clarifier wherein solids settle within said tank system comprising:
   means for ground supporting a cylindrical tank shell having an upstanding side wall;
   an inner tank shell bottom sealingly extending across a bottom of said side wall for holding a quantity of solids/liquid slurry in the tank shell;
   a sludge drain extending through said shell bottom for removal of solids that settle on the shell bottom;
   an outer tank shell bottom extending beneath, generally co-extensive with and spaced from said inner tank shell bottom to form a void space between said shell bottoms;
   the shape of the upper surface of the outer tank shell bottom corresponding generally to the shape of the lower surface of the inner tank shell bottom, with the inner tank shell bottom being generally nested in the outer tank shell bottom;
   means for accessing said void space for enabling detection of leakage of liquid in the tank shell through the inner tank shell bottom into the void space; and
   in which said sludge drain comprises a double-wall cone having an inner cone and a spaced outer cone forming a second void space therebetween, and a sludge discharge tube extending through said outer cone; and in which said means for accessing extends into the second void space between said cones with the second void space being in flow communication with the shell bottoms void space.

5. A dual-containment tank system for a solids/liquid loaded thickener/clarifier wherein solids settle within said tank system comprising:
   means for ground supporting a cylindrical tank shell having an upstanding continuous side wall;
   an inner tank shell bottom sealingly extending across a bottom of said side wall for holding a quantity of solids/liquid slurry in the tank shell;

a sludge drain extending from said inner tank shell bottom for removal of solids that settle on the inner tank shell bottom;

an outer tank shell bottom extending beneath, generally co-extensive with and spaced from said inner tank shell bottom to form a void space between said shell bottoms;

the shape of the upper surface of the outer tank shell bottom corresponding generally to the shape of the lower surface of the inner tank shell bottom, with the inner tank shell bottom being generally nested in the outer tank shell bottom;

an access to the void space for enabling detection of leakage of liquid in the tank shell leaking through the inner tank shell bottom into the void space;

wherein said means for supporting comprises an inverse conical ground bed and a support ring around the ground bed and positioned under said side wall;

wherein said outer tank shell bottom comprises a discrete sheet of fluid permeable material laid on the ground bed and sealed with respect to the tank shell inner bottom generally adjacent the outer periphery of the tank shell inner bottom; and a bed of compacted, permeable material between said sheet material and a underside of said inner tank shell bottom presenting an upper face in surface-to-surface engagement throughout substantially the entire extent thereof with the underside of the inner tank shell bottom for providing support for said inner tank shell bottom.

6. The tank system of claim 5 in which the sheet of fluid impermeable material is a plastic liner.

7. A dual-containment tank system for a solids/liquid loaded slurry thickener/clarifier wherein solids settle within said tank system comprising:

means for ground supporting a cylindrical tank shell having an upstanding side wall;

an inner tank shell bottom sealingly extending across a bottom of said side wall for holding a quantity of solids/liquid slurry in the tank shell;

a sludge drain extending through said shell bottom for removal of solids that settle on the shell bottom;

an outer tank shell bottom extending beneath, generally co-extensive with and space from said inner tank shell bottom to form a void space between said shell bottoms;

a bed of compacted permeable material in the void space presenting an upper face having a shape corresponding substantially to the shape of the lower surface of the inner tank shell bottom and being in surface-to-surface engagement throughout substantially the entire extent thereof with said lower surface of the inner tank shell bottom;

means for accessing said bed for enabling detection of leakage of liquid in the tank through said second tank bottom into said bed; and in which said sludge drain comprises a spaced double-walled cone extending from said inner tank shell bottom.

8. The tank system of claim 7 in which said permeable material is oil-impregnated sand.

9. The tank system of claim 7 further comprising means for supplying nitrogen gas into said permeable bed.

10. The tank of claim 7 further including gas inlet means for flow of gas into said spaced.

11. The tank of claim 7 in which said means for accessing includes a liquid detector.

12. The tank of claim 7 in which said means for accessing includes a leak detection pipe opening to the void space.

13. The tank of claim 12 wherein said leak detection pipe includes an inlet for injecting gas into said pipe and into the void space.

14. A dual-containment tank system for a solids/liquid loaded slurry thickener/clarifier wherein solids settle within said tank system comprising:

means for ground supporting a cylindrical tank shell having an upstanding side wall, an inner tank shell bottom sealingly extending across a bottom of said side wall; for holding a quantity of solids/liquid slurry in the tank shell;

a sludge drain extending through said shell bottom for removal of solids that settle on the shell bottom;

an outer tank shell bottom extending beneath generally co-extensive with and spaced from said inner tank shell bottom to form a void space between said shell bottoms;

the shape of the upper surface of the outer tank shell bottom corresponding generally to the shape of the lower surface of the inner tank shell bottom, with the inner tank shell bottom being generally nested in the outer tank shell bottom;

means for accessing the void space for enabling detection of leakage of liquid in the tank shell through the inner tank shell bottom into the void space; and in which said sludge drain comprises a double-wall cone having an inner cone and a spaced outer cone and defining a second void space between said cones in flow communication with means for accessing the second void space.

15. The tank system of claim 14 further comprising a bed of compacted permeable material in the void space for providing a support of said inner tank shell bottom.

16. The tank system of claim 15 in which said permeable material is oil-impregnated sand.

17. The tank system of claim 16 further comprising means for supplying nitrogen gas into said permeable bed.

18. The tank of claim 14 further including gas inlet means for flow of gas into the void space.

19. The tank of claim 14 in which said means for accessing includes a liquid detector.

20. The tank of claim 14 in which said means for accessing includes a leak detection pipe opening to the space.

21. The tank of claim 10 wherein said leak detection pipe includes an inlet for injecting gas into said pipe and into the void space.

22. A dual containment tank system for a solids/liquid slurry loaded thickener/clarifier comprising:

means for ground supporting a cylindrical tank having an upstanding sidewall;

a first tank bottom extending beneath a bottom of said tank;

a bed of material which is permeable to a flow of liquid therethrough extending across and above said tank bottom;

a second tank bottom sealingly extending across said sidewall over said permeable bed for holding a quantity of solids/liquid slurry in the tank;

a sludge drain extending through said second tank bottom for removal of solids settling out on an upper surface of said second tank bottom;

means for accessing said bed for enabling detection of leakage of liquid in the tank through said second tank bottom into said bed;
means for supplying nitrogen gas into said permeable bed; and
wherein said sludge drain includes a double wall cone having a gas inlet opening in communication with a space between said cone walls and with said means for supplying nitrogen being in communication with said gas inlet opening.

* * * * *